(12) United States Patent
Poulos

(10) Patent No.: US 6,979,036 B2
(45) Date of Patent: Dec. 27, 2005

(54) UNIVERSAL MOTOR VEHICLE APPEARANCE ENHANCER

(76) Inventor: Andrew Poulos, 568 80th St., Brooklyn, NY (US) 11209

( * ) Notice: Subject to any disclaimer, the term of this patent is extended or adjusted under 35 U.S.C. 154(b) by 0 days.

(21) Appl. No.: 10/823,194

(22) Filed: Apr. 13, 2004

(65) Prior Publication Data

US 2005/0225106 A1    Oct. 13, 2005

(51) Int. Cl.⁷ .................................................. B60J 9/00
(52) U.S. Cl. ........................................................ 296/1.08
(58) Field of Search ......................... 296/1.08, 216.01, 296/200, 201

(56) References Cited

U.S. PATENT DOCUMENTS

| | | | |
|---|---|---|---|
| 4,496,330 A | | 1/1985 | Terui |
| 5,096,225 A | * | 3/1992 | Osawa ..................... 280/11.28 |
| 5,704,173 A | * | 1/1998 | Repp et al. .................. 296/201 |
| 6,116,678 A | * | 9/2000 | Beck ........................... 296/200 |
| 6,187,233 B1 | | 2/2001 | Smith |
| 6,378,931 B1 | * | 4/2002 | Kolluri et al. .............. 296/201 |
| 6,814,385 B2 | * | 11/2004 | Fujiwara ..................... 296/201 |
| 2001/0030449 A1 | * | 10/2001 | De Paoli ..................... 296/201 |
| 2004/0075304 A1 | * | 4/2004 | Cocaign ................ 296/216.01 |
| 2004/0212223 A1 | * | 10/2004 | Donovan et al. ....... 296/216.01 |
| 2004/0256891 A1 | * | 12/2004 | Schonebeck ............. 296/16.01 |

* cited by examiner

Primary Examiner—Lori L. Coletta
(74) Attorney, Agent, or Firm—Herbert Dubno

(57) ABSTRACT

A frame which may be spanned by a panel for mounting by an adhesive or magnetically to the roof of a automotive vehicle to simulate a sunroof and thereby enhance the value and appearance thereof.

20 Claims, 10 Drawing Sheets

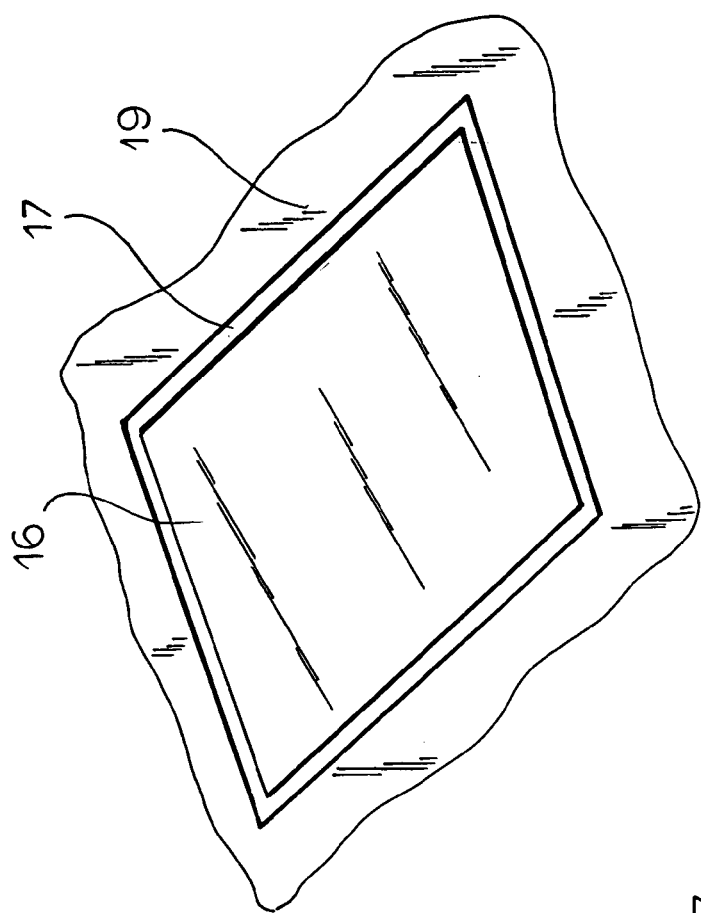
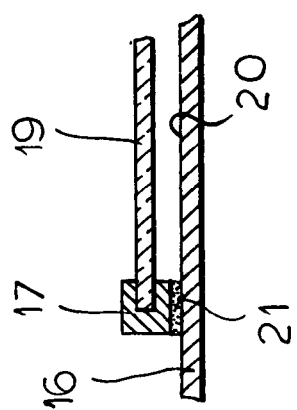
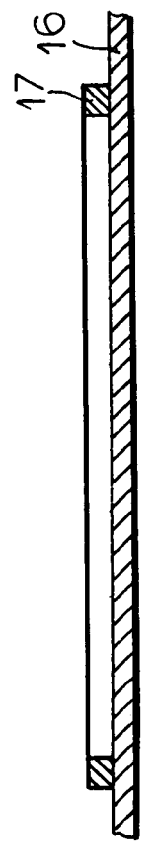

UNIVERSAL MOTOR VEHICLE APPEARANCE ENHANCER

FIELD OF THE INVENTION

My present invention relates to a universal motor vehicle appearance enhancer and, more particularly, to simulated sunroofs, windows and like structures which can be applied permanently or temporarily to automotive vehicles of all types so that the resulting automobile vehicle may have a vehicle body whose roof is provided with a simulated sun roof or which may have simulated windows or the like.

BACKGROUND OF THE INVENTION

Modern automotive vehicles are frequently equipped with sunroofs which may be opened and closed from the interior of the vehicle and which enhance the value and appearance of the vehicle. Frequently, it is desirable to enhance the appearance of a vehicle which originally was not equipped with a sunroof, either to increase the value thereof or to produce a more prestigious sense for the vehicle.

In vans or the like, side windows of various sizes and shapes can normally be provided to provide light and air to the interior lower cost vans, however, may not have side windows. Furthermore, automobiles may have side windows of various configurations and which generally enhance the value of the vehicle or define the style thereof.

OBJECT OF THE INVENTION

It is, therefore, the principal object of the present invention to provide a device which can enhance the value or prestigious look and feel of an automotive vehicle at comparatively low cost.

Another object of the invention is to provide an appliance or accessory for an automotive vehicle capable of enhancing the value and appearance thereof.

SUMMARY OF THE INVENTION

These objects and others which will become apparent hereinafter are attained in accordance with the invention by providing the vehicle roof of an automotive vehicle with a frame which is affixed to the exterior thereof by suitable means, e.g. an adhesive, magnetic member or, if greater permanence is desired, screws or the like, and which outlines an area normally identifiable as a sunroof. That frame may be used alone or may be spanned by a panel, thereby simulating a sunroof. Of course, the faux sunroof thus provided is neither openable nor capable of transmitting light into the interior of the vehicle.

The frame can have a relatively small thickness so that it does not project significantly above the roof of the vehicle body but nevertheless is capable of giving the appearance that the vehicle has a sunroof. The panel may be a glass or simulated glass panel which can be opaque or of limited transparency and a which can be of coloration or appearance different from the coloration of the surrounding vehicle body roof.

That principle can have more universal application. For example, the frame and the panel may represent a side window or a window structure which encompasses a part of the roof of a vehicle and a part of a side thereof and may be provided simply to impart a more sporty look to the vehicle or give a van, for example, the appearance of a vehicle having a number of side windows. The panels may be flat or of a bubble shape and the frame may be round, oval, polygonal or of some other configuration representing, for example, a symbol such as a heart or droplet. Application of faux side windows, for example, can decommercialize a work van or impart a custom look thereto for a night out. The windows, if removable, can be marketed as a kit with a number of such windows of different shapes which can be applied as desired. In practice, if the window is temporarily attached by magnetic means, it should be removed for automatic car washing of the vehicle. If permanently attached, of course, a car wash is not a problem.

BRIEF DESCRIPTION OF THE DRAWING

The above and other objects, features, and advantages will become more readily apparent from the following description, reference being made to the accompanying drawing in which:

FIG. 2 is a detail showing a glass pane as the panel surrounded by the frame;

FIG. 3 is a cross section through the frame, panel and roof of the vehicle body;

FIG. 4 is a cross sectional view of another embodiment;

SPECIFIC DESCRIPTION

Figure 1:
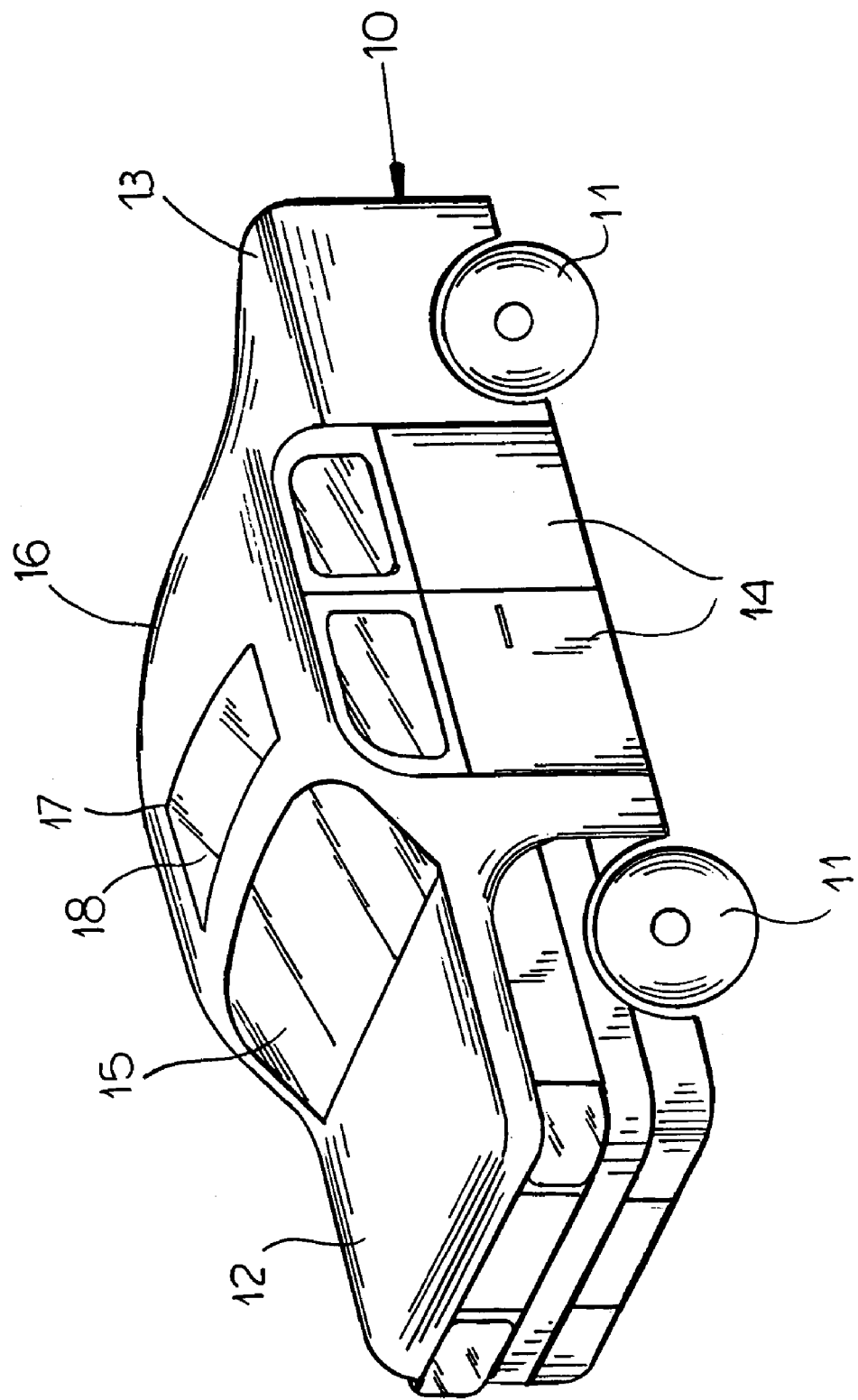
FIG. 1 is a perspective view of an automotive vehicle equipped with the accessory of the present invention.

In FIG. 1, I have shown a vehicle body 10 which, as is normally the case with a passenger vehicle, comprises a chassis mounted on wheels 11 and a body structure with the usual hood 12, trunk 13, doors 14, windshield 15 and vehicle body roof 16.

According to the invention, a frame 17 is applied to the vehicle body roof in a position in which the frame outlines an area 18 normally occupied by a sunroof of the vehicle.

As can be seen from FIG. 2, that frame 17 may be spanned by a panel 19 which may be a glass panel or a panel of a polyacrylate or other glass-simulating plastic or synthetic resin which may be translucent and of a coloration different from the coloration of the vehicle body roof so as to further enhance the simulation of a sunroof by a frame and the panel (see FIG. 3, for example).

Of course, the roof structure 20 within the frame remains in place and thus the simulated sunroof of the invention can neither open nor be light conducting to the vehicle interior.

As can also be seen from FIG. 3, the frame 17 may be held to the vehicle body roof 16 by a layer of adhesive 21.

The simulated sunroof may be marketed with the adhesive covered by a masking so that application of the faux sunroof to the vehicle body roof can be relatively simple. All that is necessary is to remove the masking strip and press the pressure sensitive adhesive layer and the frame against the roof of the vehicle in a position of the frame capable of simulating a sunroof.

In FIG. 4, I have shown a frame 17 which is itself magnetic, i.e. a permanent magnetic and which magnetically adheres to the roof 16 of the vehicle to simulate the sunroof. That frame may also have a panel within the interior thereof. The frame may be composed of a metal which can be magnetized at selected locations or over its entire perimeter, can be equipped with permanent magnets or can be composed of a synthetic resin material which may be metal plated or coated and which may be fitted with permanent magnets if desired.

Other attachment systems may be used where necessary, for example, sheet metal screws or self-tapping screws.

Figure 5:
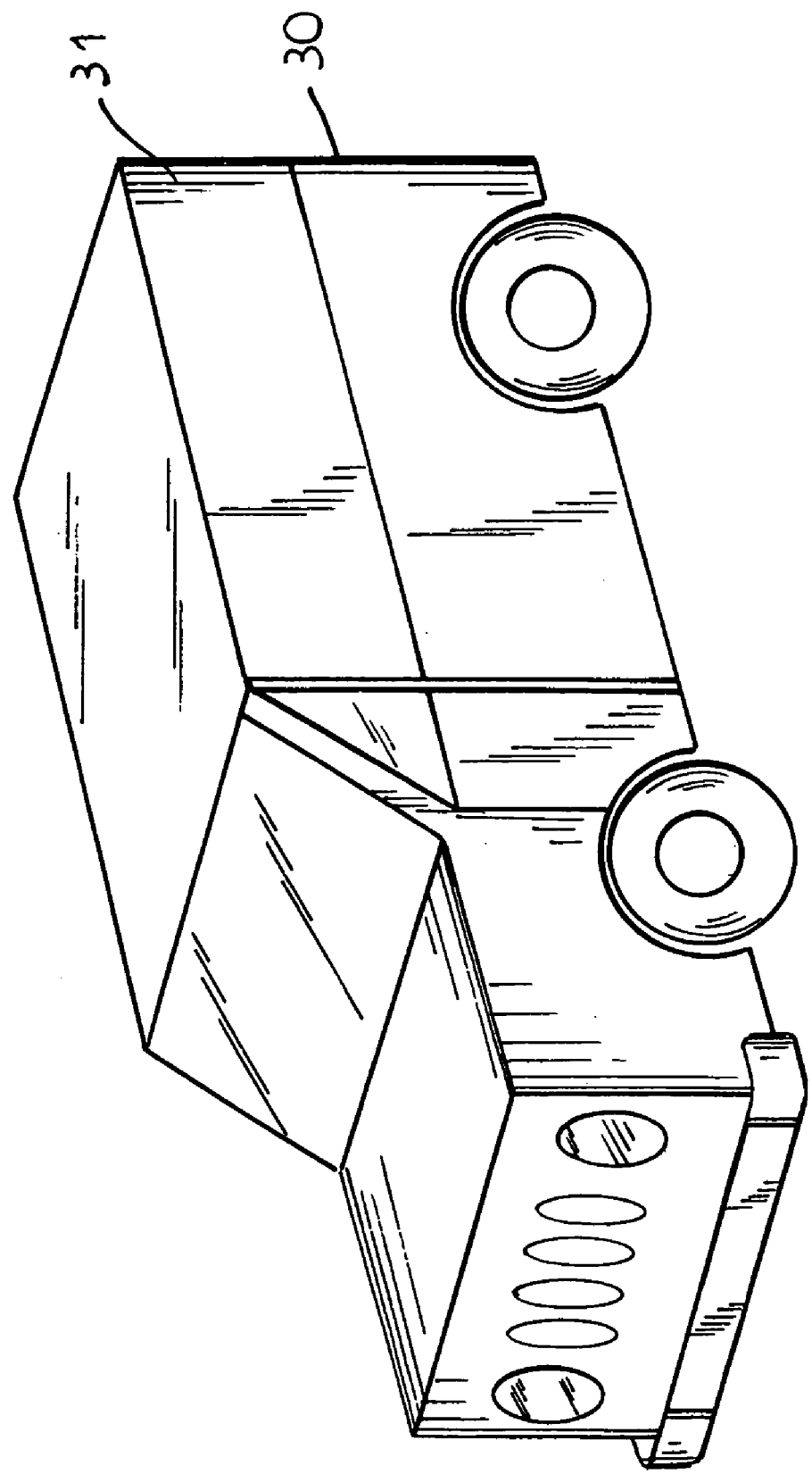
FIG. 5 shows a work van which can have its appearance enhanced, according to the invention.
Figure 6:
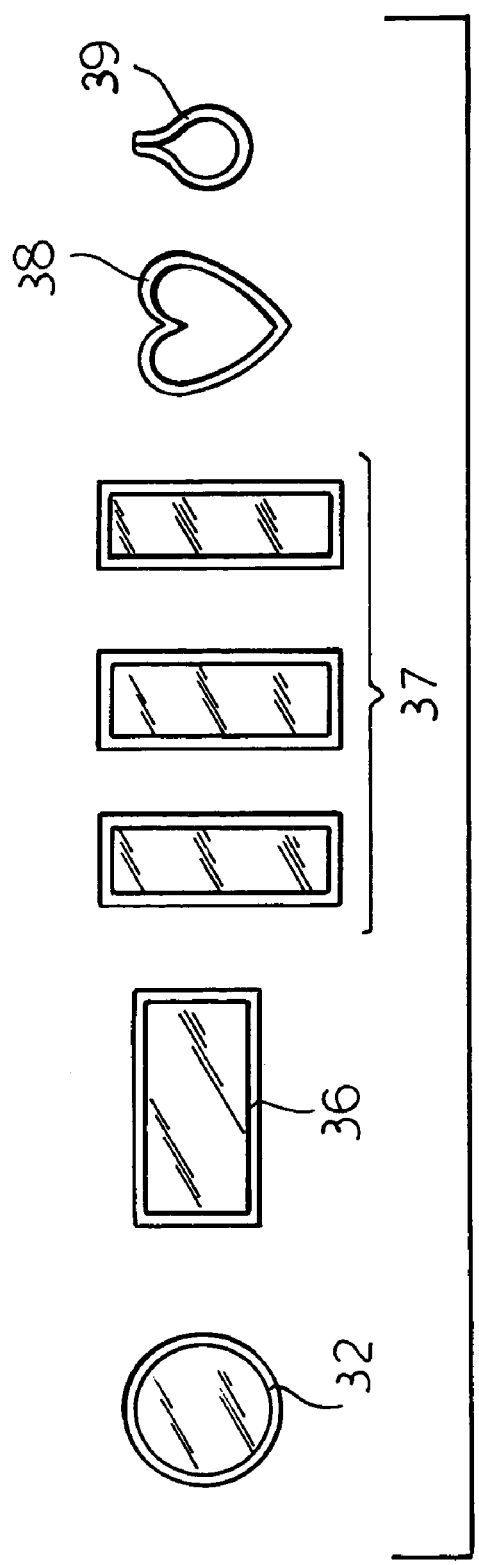
FIG. 6 illustrates a set of side windows which can be provided in a kit for such enhancement.
Figure 7:
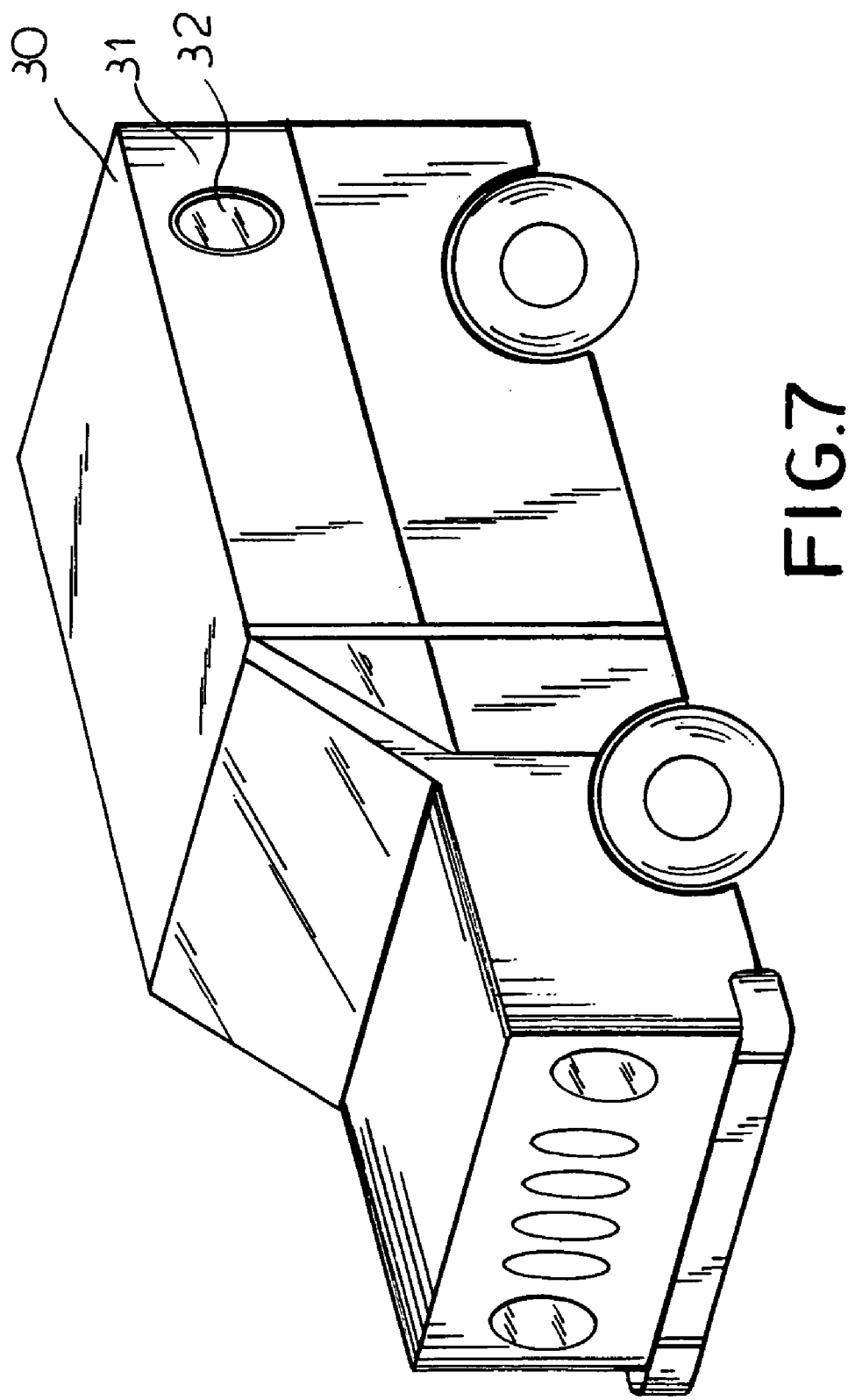
FIG. 7 is a view similar to FIG. 5 showing the van after enhancement.
Figure 15:
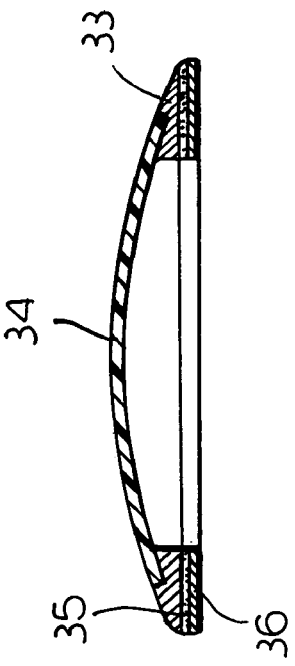
FIG. 15 is a cross sectional view taken along the line XVI—XVI of FIG. 14.

The universality of the invention will be apparent from FIGS. 5–7 in which I have shown a work van 30 with side panels 31 which are solid. The appearance of such a work van can be enhanced and indeed the work van can to the viewer be converted from a work van by applying one or more faux windows to the panel 31 (see FIG. 7) in that FIG. 1 show a circular window 32 which as can be seen from FIGS. 14 and 15, may have a bubble-shaped panel rather than a flat panel within the frame 33.

Figure 8:
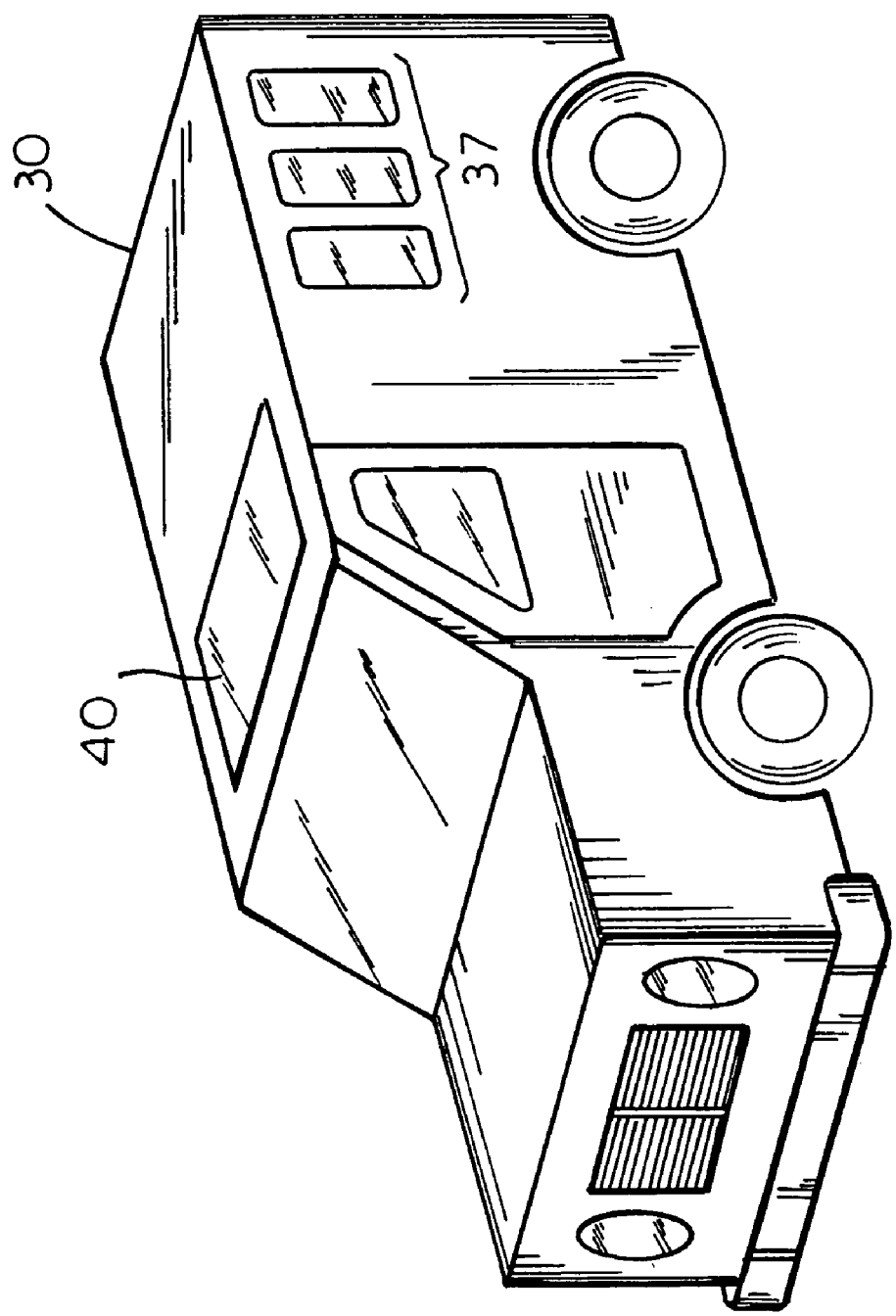
FIG. 8 is an illustration of another van using the kit of FIG. 6.
Figure 14:
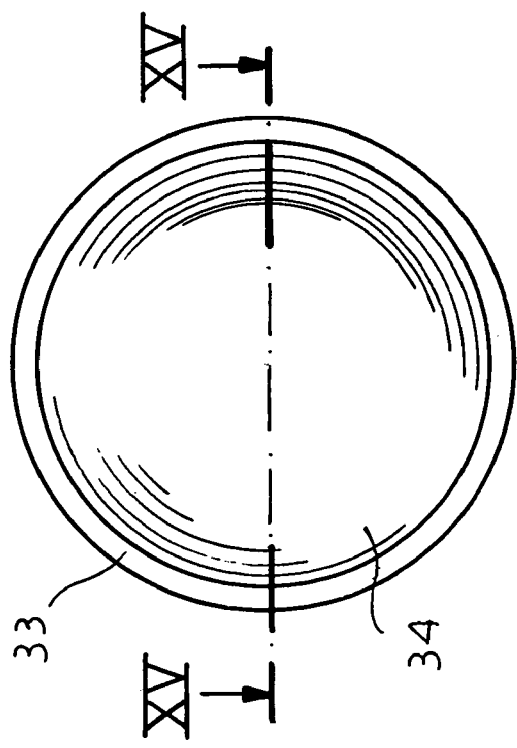
FIG. 14 is a view of a circular faux window according to the invention.

In FIG. 14, the bubble shaped panel 34, of glass or polyacryalate is anchored to the frame 33 which has circular strip of adhesive 35 to attach that faux window to the panel 31 after a masking strip 36 is peeled away. Any of the other attachment techniques can also be used. That "window" 32 can be one of a set with faux windows of other shapes and marketed in a kit as shown in FIG. 6. That kit has, for example, a rectangular faux window 36, a set of three rectangular faux windows, a heart shaped faux window 38 and a droplet shaped faux window 39, all with frames around flat gas or polyacrylate panels or dome or bubble shaped glass or polyacrylate panels. The van 30 in FIG. 8 can be seen to have a sun roof 40 as has been described in FIGS. 1–4 as well as the set of three rectangular faux windows 37 along its side.

Figure 9:
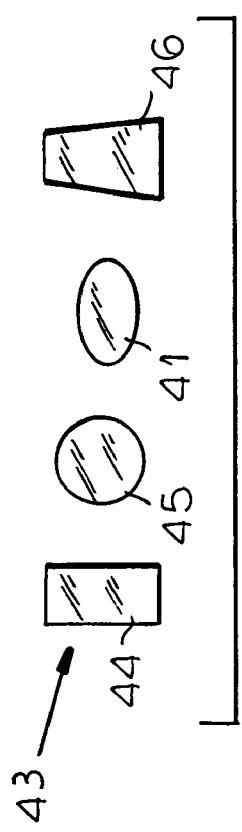
FIG. 9 is a diagram illustrating another set of side windows which may be used.
Figure 10:
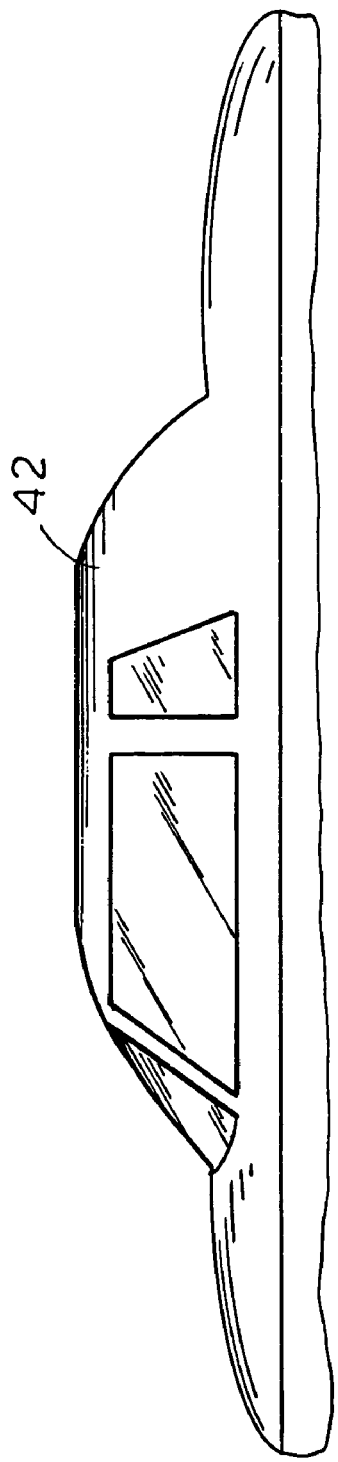
FIGS. 10 and 11 are elevational views of vehicle tops showing application of the invention to a vehicle.
Figure 11:
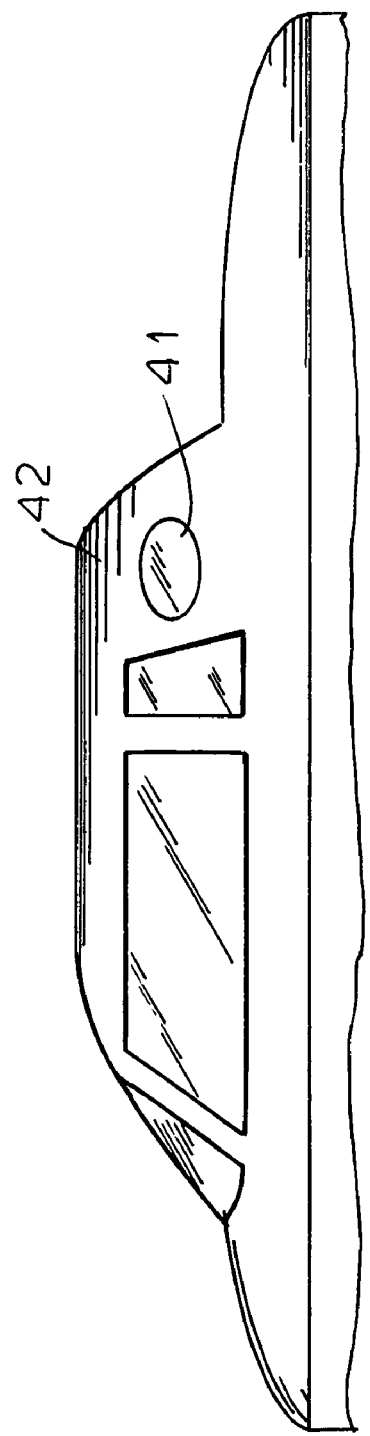

In FIG. 9 I have shown a set of faux windows which can be used on a passenger vehicle to provide, for example, an opera style over window 412 for the motor vehicle 42 to enhance the appearance thereof (compare FIGS. 10 and 11). The windows in the set 43 of FIG. 9 can include a rectangular faux window 44 a circular faux window 45, the oval faux window 41 and a trapezoidal faux window 46.

Figure 12:
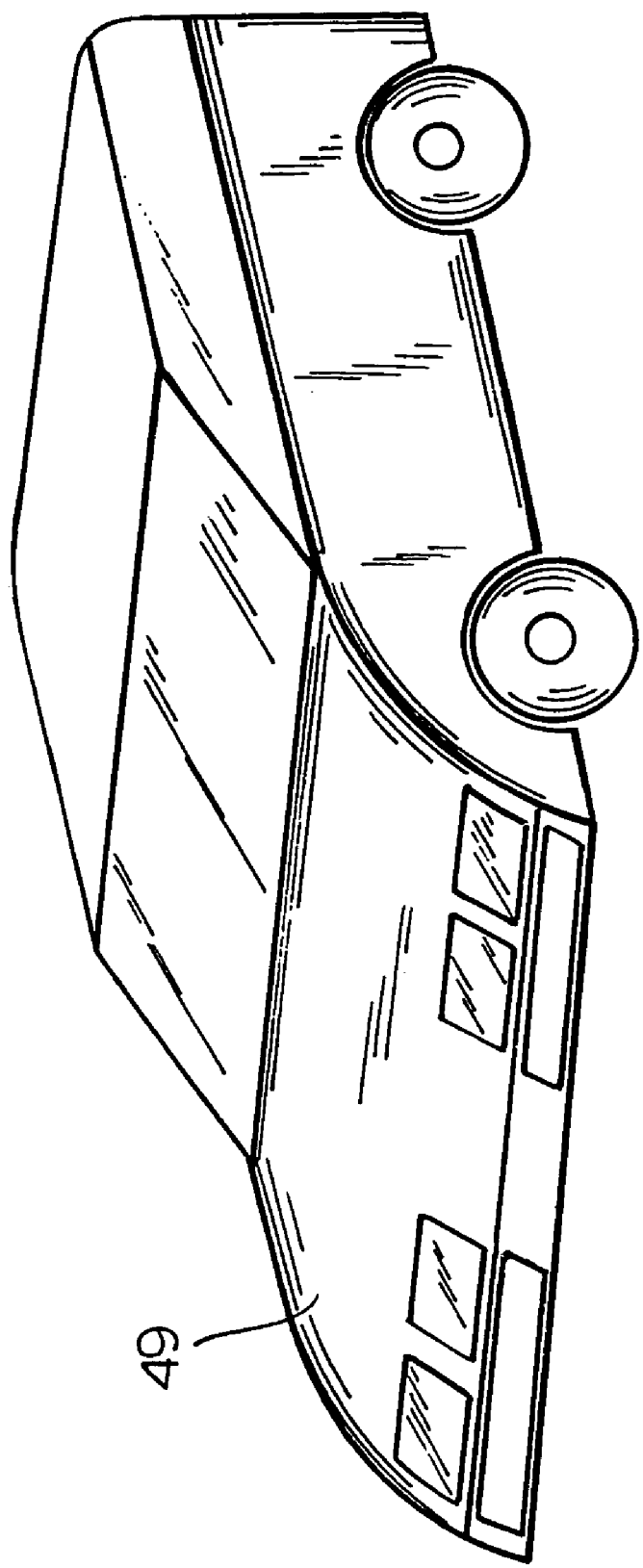
FIGS. 12 and 13 are perspective views showing the conversion of a sports car into a T-top vehicle.
Figure 13:
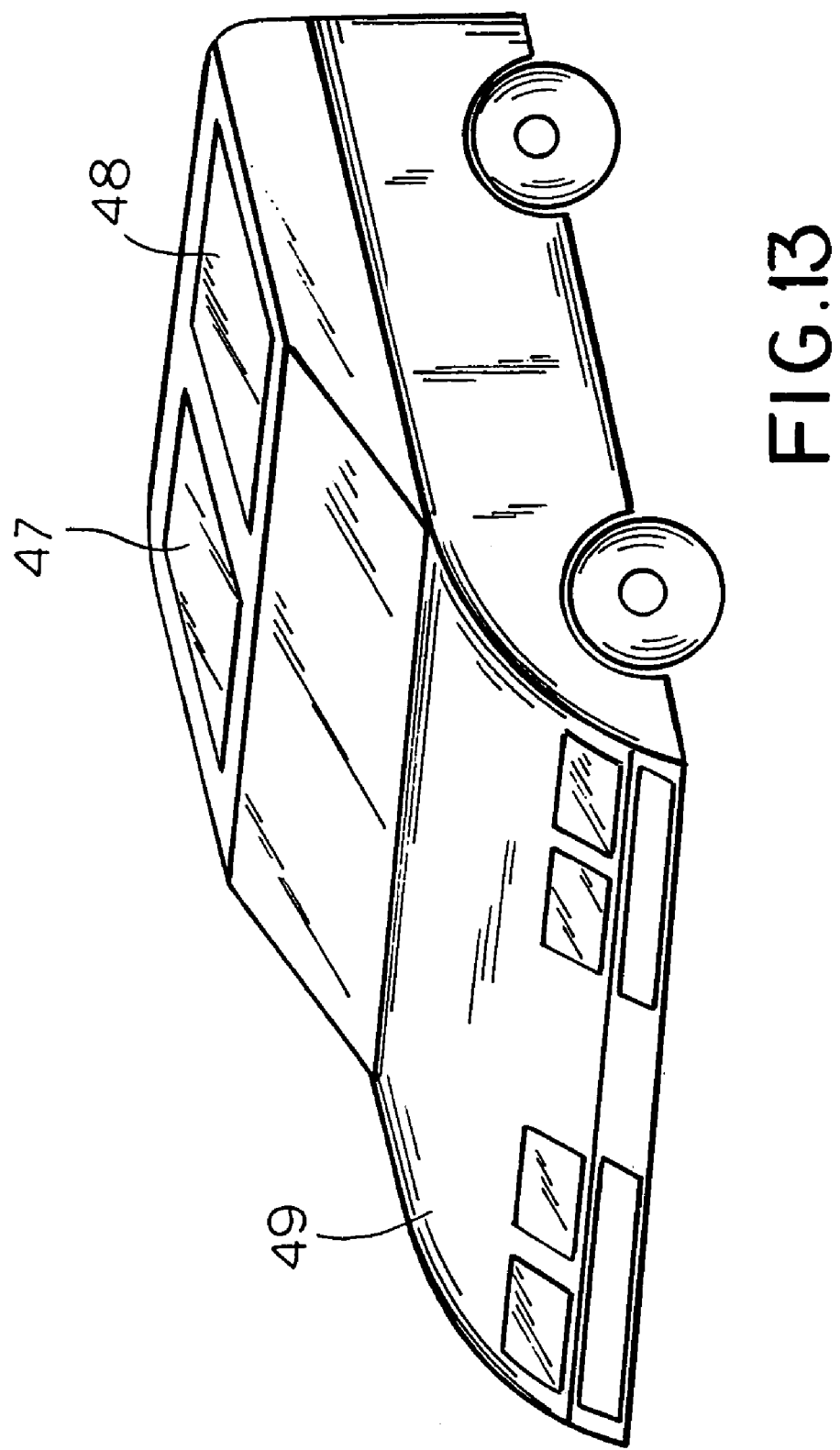

Faux window 47 and 48 can be used on the sports vehicle 49 shown in FIG. 12 to impart a T-topped appearance (see FIG. 13).

What is claimed is:

1. In an automobile having a vehicle body with a roof, the combination therewith of a frame overlying a portion of said roof with a outline corresponding to that of a sunroof, around a portion of the roof without a roof opening and simulating a sunroof, and at least one member adhesively or magnetically affixing said frame to said roof of said vehicle body.

2. The combination defined in claim 1, further comprising a panel affixed to said frame and spanning an interior thereof and simulating a sunroof panel.

3. The combination defined in claim 2 wherein said member is an adhesive interposed between said frame and said vehicle roof.

4. The combination defined in claim 2 wherein said member is formed by a magnet.

5. The combination defined in claim 4 wherein a portion of said frame is magnetic.

6. The combination defined in claim 1 wherein said member is an adhesive interposed between said frame and said vehicle roof.

7. The combination defined in claim 1 wherein said member is formed by a magnet.

8. The combination defined in claim 7 wherein a portion of said frame is magnetic.

9. A universal automotive vehicle appearance enhancer, in combination with a vehicle body, comprising a frame adapted to be secured to a portion of said body having a window-free surface adapted to span the interior of said frame, a panel within said frame having the appearance of a window on said body, and means adhesive or magnetic for attaching said frame to said body.

10. The enhancer as defined in claim 9 wherein said frame overlies a roof of said body and simulates with said panel a sun roof.

11. The enhancer as defined in claim 9 wherein said frame is affixed to a side wall of said body and with said panel creates the appearance of a window in said body.

12. The enhancer as defined in claim 9 wherein said means is magnetic.

13. The enhancer as defined in claim 9 wherein said means is an adhesive interposed between said frame and said body.

14. The enhancer as defined in claim 9 wherein said panel is composed of glass.

15. The enhancer as defined in claim 9 wherein said panel is composed of a plastic.

16. The enhancer as defined in claim 9 wherein said panel has the form of a bubble projecting outwardly from a plane of said frame.

17. The enhancer as defined in claim 9 wherein said frame has a chromium finish.

18. The enhancer as defined in claim 9 wherein said frame is polygonal.

19. The enhancer as defined in claim 9 wherein said frame has a curved configuration.

20. The enhancer as defined in claim 9 wherein the enhancer forms part of a kit of a plurality of enhancers of different shapes.

* * * * *